United States Patent [19]

Torazzina

[11] Patent Number: 5,692,041
[45] Date of Patent: Nov. 25, 1997

[54] TELEPHONE SUBSCRIBER CIRCUIT WITH GALVANIC ISOLATION

[75] Inventor: Aldo Torazzina, Biassono, Italy

[73] Assignee: SGS-Thomson Microelectronics S.r.l., Agrate Brianza, Italy

[21] Appl. No.: 330,540

[22] Filed: Oct. 27, 1994

[30] Foreign Application Priority Data

Oct. 29, 1993 [EP] European Pat. Off. ............ 93830434

[51] Int. Cl.$^6$ ..................................................... H04M 1/00
[52] U.S. Cl. ...................... 379/379; 379/399; 379/413; 379/414
[58] Field of Search ........................ 379/379, 399, 379/402, 413, 414, 415, 405, 406, 56, 387

[56] References Cited

U.S. PATENT DOCUMENTS

| | | | |
|---|---|---|---|
| 4,028,498 | 6/1977 | Mehaffey et al. | 379/216 |
| 4,074,081 | 2/1978 | Humm | 379/379 |
| 4,133,982 | 1/1979 | Lee et al. | 379/379 |
| 4,311,879 | 1/1982 | Brush | 379/379 |
| 4,558,183 | 12/1985 | Corris et al. | 379/56 |
| 4,603,234 | 7/1986 | Huet et al. | 379/379 |
| 4,633,040 | 12/1986 | Lesea | 379/379 |
| 4,727,535 | 2/1988 | Brandt | 379/379 |
| 4,817,204 | 3/1989 | Jannelli et al. | 379/379 |
| 5,291,545 | 3/1994 | Stahl | 379/379 |
| 5,329,584 | 7/1994 | Nagato | 379/399 |
| 5,402,484 | 3/1995 | Siligoni et al. | 379/399 |
| 5,432,835 | 7/1995 | Hashimoto | 379/379 |

FOREIGN PATENT DOCUMENTS

| | | | |
|---|---|---|---|
| 0 166 393 A3 | 1/1986 | European Pat. Off. | H04M 1/27 |
| 0 262 957 A2 | 4/1988 | European Pat. Off. | H04M 1/31 |
| 2 250 661 | 6/1992 | United Kingdom | H04M 1/30 |

OTHER PUBLICATIONS

Hafer, R., "Designing Telephone–Interface Circuitry With Solid–State Relays," *Electronic Design International* 38(23): 91–93, 95–96, 1990.

Primary Examiner—Krista M. Zele
Assistant Examiner—Scott Wolinsky
Attorney, Agent, or Firm—David V. Carlson; Clarence T. Tegreene; Seed and Berry LLP

[57] ABSTRACT

A telephone subscriber circuit is coupled via a single galvanic isolation element to provide, from a subscriber apparatus unconnected to the telephone line, on- and off-hook signals to the telephone line and to control transfer of telephonic signals between the subscriber apparatus and the telephone line. The galvanic isolation element is a photocoupler. The subscriber circuit includes a speech circuit coupled to the line through a diode bridge circuit and an electronic switch is connected between the speech circuit and the diode bridge circuit. An input terminal of the speech circuit and a control terminal of the electronic switch are each connected through a voltage-generating circuit and level-translating circuit to an output terminal of the galvanic isolation element.

13 Claims, 2 Drawing Sheets

TELEPHONE SUBSCRIBER CIRCUIT WITH GALVANIC ISOLATION

TECHNICAL FIELD

This invention relates to telephone subscriber circuits, specifically circuits which enable subscriber apparatus drawing no power from a telephone line to be coupled to the line.

BACKGROUND OF THE INVENTION

Such equipment as telephone answering systems or computer terminals used in lieu of traditional phone sets require, for proper handling of all their usual functions, to be fully uncoupled electrically from the line. To enable the "decadic" functions of line hooking on/off, or pulse sending, in order to call another subscriber, and of voice signal transmitting in the hooked-on condition of the line—using apparatus which are powered separately from the line—to be performed, the electric uncoupling is customarily ensured by such elements as relays, transformers, or photocoupling devices.

Prior approaches have used two discrete paths, quite simply implemented by conventional techniques, to provide the decadic line hook-on/off functions separately from the voice signal transmission function during the line hook-on step. Such is accomplished by means of two galvanic isolation elements of the aforementioned kinds. The two elements may be of two different types.

SUMMARY OF THE INVENTION

An underlying technical problem addressed by this invention is reducing the number of the components required in a telephone subscriber circuit for driving a telephone line hooking-on/off and transferring signals over the telephone line from subscriber apparatus not powered through said line, by omitting one of the two galvanic isolation elements employed heretofore.

This reduction in the number of components is desirable to bring down cost and the occupation of integration area while improving reliability. This technical problem is addressed by a telephone subscriber circuit as outlined above.

A telephone subscriber circuit coupled to the terminals of a telephone subscriber line through a bridge circuit comprises a speech circuit for transmitting and receiving voice signals which has at least one input terminal for coupling to a subscriber apparatus not powered from the telephone line and an output terminal coupled to a terminal of the bridge circuit. The subscriber circuit also includes a switch having a control terminal, the switch being connected between said terminal of the bridge circuit and said output terminal of the speech circuit, and a galvanic isolation element having at least one input terminal and one output terminal, the input terminal of said isolation element being coupled to the subscriber apparatus and the output terminal coupled both to the input terminal of the speech circuit and the control terminal of the switch.

In one embodiment, the switch comprises a transistor element having first and second terminals wherethrough it is connected between said terminal of the bridge circuit and the output terminal of the speech circuit, and a control terminal forming the control terminal of the switch.

The galvanic isolation element comprises an emitting photodiode and a receiving phototransistor, the photodiode being incorporated to an input stage for connection to subscriber apparatus, the input stage being connected between two terminals of a separate voltage supply from the telephone line, the phototransistor being connected to a circuit node, having the control terminal of the switch and the input terminal of the speech circuit coupled thereto, and to a reference voltage of the circuit. Connected between the control terminal of the switch and the circuit node is a level-translating circuit means, and that the input terminal of the speech circuit is connected to a first terminal of a capacitive element, a second terminal of the capacitive element being connected to the circuit node through a voltage-generating circuit means, said level-translating circuit means and said voltage-generating circuit means being driven by the phototransistor through said circuit node. The second terminal of the capacitive element is connected to a reference voltage through a first resistive element and to the circuit node through a first transistor having a control terminal connected to a potential reference.

The transistor element has a Darlington type of structure and the level-translating circuit means comprises a second transistor being connected, by first and second terminals thereof and in series with a second resistive element, between the control terminal of the switch and the circuit node, and having a control terminal connected to a reference voltage. The second transistor is a D-MOS depletion type.

In one embodiment, the transistor element has a Darlington type of structure and the level-translating circuit means comprises a second transistor being connected, by first and second terminals thereof and in series with a second resistive element, between the control terminal of the switch and the circuit node, and having a control terminal connected to a reference voltage.

The features and advantages of a telephone subscriber circuit according to the invention will be apparent from the following description of an embodiment thereof, given by way of example and not of limitation with reference to the accompanying drawings.

DETAILED DESCRIPTION OF THE INVENTION

Figure 1:
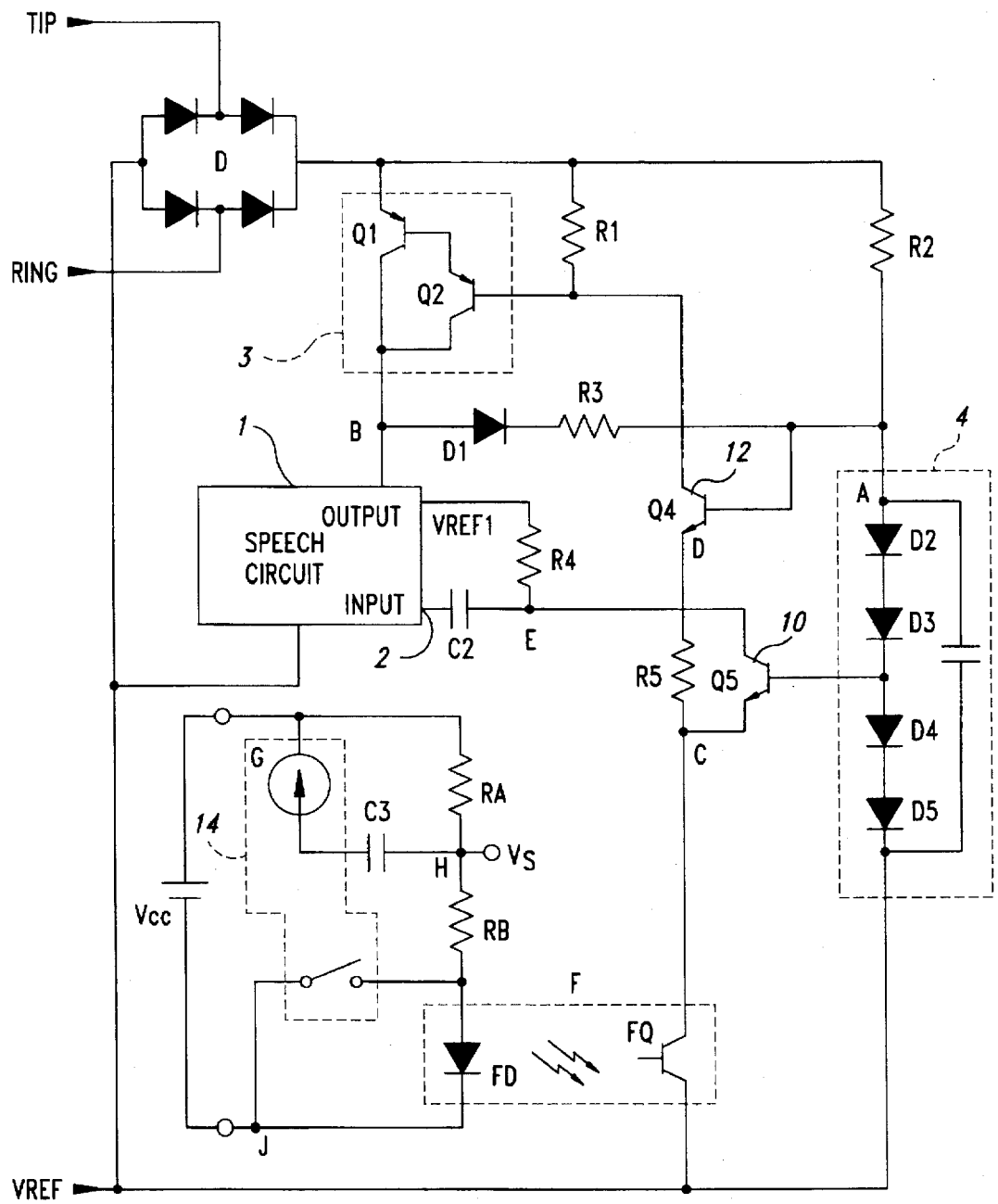
FIG. 1 shows a diagram, partly in block form, of a telephone subscriber circuit according to the invention which may be implemented in a technology of the bipolar type.

The circuit diagram shown in FIG. 1 includes a speech circuit 1 for transmitting and receiving voice signals. The speech circuit 1 may be a conventional telephone speed circuit and is coupled to the two terminals, TIP and RING, of a telephone subscriber line through a bridge circuit D, usually a diode bridge.

This speech circuit 1 has an input terminal 2 coupled, through a voltage-generating circuit means 10, to a photocoupler element F comprising a receiving phototransistor FQ and an emitting photodiode FD. The voltage-generating circuit means 10 comprises a transistor Q5 connected at a circuit node C to the phototransistor FQ and connected to the input terminal 2 of the speech circuit 1 via a capacitor C2.

Connected between a terminal of the bridge circuit D and the output terminal of the speech circuit 1 is a switch 3, which may consist of a switching circuit means such as a Darlington arrangement, as shown in FIG. 1. The circuit structure comprises a pair of transistors, Q1 and Q2. The switch 3 is driven by a transistor Q4 connected in series with a resistor R5, between said Darlington arrangement and the circuit node C.

The control terminal (base) of the transistor Q4 is connected to a balanced bias circuit means 4, to which the base terminal of the transistor Q5 is also connected. The balanced bias circuit means includes diodes D2, D3, D4, D5 connected serially, in parallel with a capacitor C1, between the circuit node A and a reference potential VREF also having the phototransistor FQ connected thereto and constituting a virtual ground for the telephone circuit.

The photodiode FD is incorporated in an input stage 5 that is connected between two terminals of a voltage supply Vcc. The input stage 5 allows connection to a subscriber apparatus 14 that is not powered by the telephone line, as represented by a generator G of alternating signals and a pulse-generating switch I, as shown in the drawings. In FIG. 1, all the transistors in the diagram are bipolar transistors.

Figure 2:
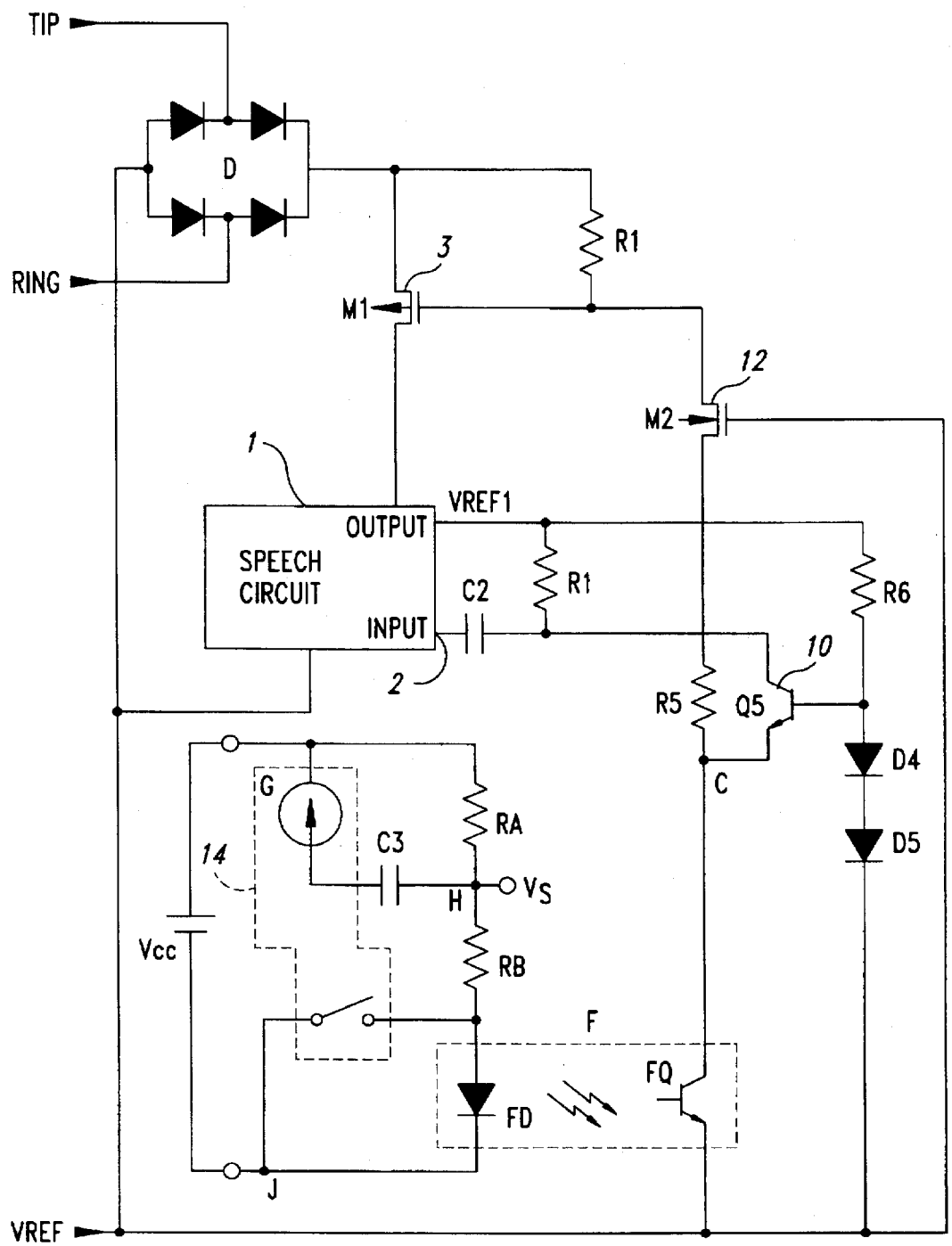
FIG. 2 shows a preferred embodiment of subscriber circuit of FIG. 1 which may be implemented in a technology of the MOS or mixed type.

The circuit diagram depicted in FIG. 2 illustrates a different embodiment of a telephone subscriber circuit according to the invention. This embodiment also includes a voltage supply means comprising a transistor Q5 connected between the photodiode FD and the input terminal of the speech circuit.

However, the switch 3 may be a field-effect transistor M1, specifically a P-channel transistor, although a Darlington arrangement may also be used. The level translation circuit means 12, that in the scheme of FIG. 1 was implemented by the balanced bias transistor Q4, should now be implemented, however, by a transistor M2 of the D-MOS depletion type.

As mentioned, the invention is directed to using a single galvanic isolation element (photocoupler F), capable of transferring the telephone line closing and opening functions, the decadic function, and transfer of the transmitted voice signal from an apparatus powered from an external source of the telephone line.

The opening, closing, and decadic functions will now be discussed with reference to FIG. 1. The Darlington combination of transistors Q1, Q2 acts as a line electronic switch 3. Upon a voltage equal to 2Vbe (where Vbe is the threshold voltage of each of the transistors Q1, Q2) appearing across resistor R1, transistors Q1 and Q2 saturate, connecting the line terminals TIP and RING through the diode bridge D to the speech circuit 1, which synthesizes the appropriate line closure impedances AC and DC.

With transistors Q1 and Q2 "making", at the node B there will appear a positive DC potential relative to the reference potential VREF which is dependent on the value of the line current. This potential at node B maintains a bias voltage of 4Vbe (the voltage drop through diodes D2, D3, D4, D5) at the node A, by supplying current via diode D1 and resistor R3. With Q1 and Q2 "breaking", on the other hand, the potential at the node B will be cancelled relative to the reference, and the bias of the node A held by the charge of the capacitor C1 and the small current (on the order of a few microamperes) drawn by resistor R2 from the line, resistor R2 having a large value.

The line closing/opening function and the decadic function (similar to the previous one but having defined open/close timing sequences) are controlled from the switch I, being electrically isolated from the line by the photocoupler F. With the switch I open, the resistors RA and RB are connected to a positive DC reference potential (+Vcc) which causes a DC biasing current to flow through the photodiode FD which is transferred into the phototransistor FQ at a multiplication factor K.

Thus, a current will flow through the phototransistor FQ which is given by the following relation:

$$IFQ=[(Vcc-Vfd)\div(RA+RB)]*K$$

where, Vfd is the voltage drop across the photodiode. With the switch I closed, the photodiode FD would be off, and the current value IFQ cancelled.

The current IFQ will flow from the collector of the phototransistor FQ and split at the node C to follow two paths: a portion of it goes through resistor R5, and the remainder through transistor Q5 to resistor R4, namely IFQ=IR5+IR4 where IR5 is the current through resistor R5 and IR4 is the current through resistor R4.

The two emitter followers associated with the transistors Q4 and Q5 set the potential values at the nodes C and D to 1Vbe and 3Vbe, respectively, where Vbe is the base-emitter voltage of the transistors Q4 and Q5 and is equal to the voltage drop across each of the diodes D2, D3, D4, D5, thereby determining the value of the current IR5, namely IR5=2Vbe/R5 where R5 is the value of the resistor R5.

This current, when injected from the collector of transistor Q4 into the base terminal of the Darlington arrangement including the transistors Q1 and Q2, brings the latter to a saturation range, thereby completing the line close function.

For proper operation, the value of the current IR5 should be selected to ensure saturation of the Darlington under all the operating conditions of the line current. Of course, the value of the current IFQ should be selected higher than the current IR5 at all times.

As for voice signal transfer, the current IFQ in excess of the constant value of the current IR5 is transferred into the resistor R1 through the emitter follower Q5, the resistor R1 being connected to a reference potential VREF1 which may be incorporated in the speech circuit.

Thus, a DC bias is established at the node E as follows:

$$VE=VREF1-(R4*IR4)$$

where VE is the voltage at node E.

If, with the switch I open (line hooked on), a voice signal (Vs) is applied between the node H linking resistors RA and RB together and to the node J, a current is established through the photodiode FD which is proportional to the value of the voltage of the voice signal Vs divided by the resistive value of the resistor RB. This current, as transferred at a factor K of the photocoupler F, is injected into the node C from the phototransistor FQ.

Since the current IR5 is a constant current, all the signal current will be transferred to the resistor R4, and at the node E will appear a voltage signal $Vs_E$ which, when the splitting between the emitter resistance of the transistor Q5 and the resistor R5 is neglected, is $$Vs_E=[Vs/(RB)]*K*R4.$$

The total current supplied by the voice signal is proportional to RA∥RB where RA∥RB is the resistive value of resistors RA and RB in parallel.

This signal is applied, through the capacitor C2, to the input terminal of the speech circuit 1, which will suitably amplify and transfer it to the telephone line.

The embodiment shown in FIG. 2 is advantageous over that in FIG. 1 on account of it using a smaller number of components, and the fact that with the line in the open condition there will occur no drawing of current on the telephone line. The voice signal $V_s$ is transferred similarly to the previous embodiment.

The electronic switch 3 with the parallel resistor R1 is formed by a P-channel MOS transistor M1 of the highvoltage type which, as mentioned, may replace the Darlington arrangement including transistors Q1, Q2, and resistor R1 in FIG. 1 to perform the same function. The level translating means 12 consisting of transistor Q4 in FIG. 1 is replaced by an N-channel MOS transistor M2 of the depletion type having a gate terminal connected to the potential VREF.

With the switch I open, as explained above, the phototransistor FQ goes into its conduction range to establish a flow of current through resistor R5 and transistor M2, thereby providing the appropriate gate voltage across resistor R1 to bring the transistor M1 to its conduction range.

This gate voltage is controlled by the values of resistors R1 and R5 and the threshold voltage of the transistor M2.

With the switch I closed, no current flows through the phototransistor FQ, and hence through transistor M2, so that the transistor M1 will also be "open" to the line.

One advantage of the proposed circuit solution is made apparent by that a single galvanic isolation photocoupling element is used and requires no special designing problems or complicated circuitry.

It will be appreciated that modifications, integrations, and substitutions may be made unto the embodiment form described hereinabove by way of non-limiting example without departing from the scope of the appended claims.

I claim:

1. A telephone subscriber circuit coupled to the terminals of a telephone subscriber line through a bridge circuit, the telephone subscriber circuit comprising:

a speech circuit for receiving voice signals from the subscriber line and outputting corresponding output voice signals which has at least one input terminal adapted for coupling to a telephonic subscriber apparatus not powered from the telephone line and an output terminal coupled to a terminal of the bridge circuit;

a switch having a first terminal, a second terminal, and a control terminal, the first terminal being coupled to said terminal of the bridge circuit and the second terminal being coupled to said output terminal of the speech circuit; and a galvanic isolation element having at least one input terminal and one output terminal, wherein the input terminal of said isolation element is coupled to the subscriber apparatus and the output terminal of the isolation element is coupled both to the input terminal of the speech circuit and the control terminal of the switch at a circuit node.

2. A telephone subscriber circuit according to claim 1 wherein the switch comprises a transistor having first, second and transistor control terminals connected to said terminal of the bridge circuit, the second terminal being connected to the output terminal of the speech circuit, the transistor control terminal forming the switch control terminal.

3. A telephone subscriber circuit according to claim 2 wherein the galvanic isolation element includes:

an input stage for connection to the subscriber apparatus, the input stage including an emitting photodiode, the input stage being connected between two terminals of a voltage supply independent of the telephone line; and a receiving phototransistor, the phototransistor being connected between a circuit node and a reference voltage.

4. A telephone subscriber circuit according to claim 3, further including:

a voltage generating circuit;

a level-translating circuit connected between the control terminal of the switch and the circuit node; and a capacitive element, wherein the input terminal of the speech circuit is connected to a first terminal of the capacitive element, a second terminal of the capacitive element is connected to the circuit node through the voltage-generating circuit, wherein said level-translating circuit and said voltage-generating circuit are driven by the phototransistor through said circuit node.

5. A telephone circuit according to claim 4 wherein the second terminal of the capacitive element is connected to the reference voltage through a first resistive element and to the circuit node through a first transistor having a control terminal connected to a reference voltage.

6. A telephone circuit according to claim 5 wherein the transistor includes a Darlington-connected pair of transistors and the level-translating circuit includes a second transistor having first and second terminals connected in series with a second resistive element, between the control terminal of the switch and the circuit node, the second transistor having a control terminal connected to a reference voltage.

7. A circuit according to claim 6 wherein the second transistor is a depletion type metal oxide semiconductor (MOS) device.

8. A telephone circuit according to claim 4 wherein the transistor includes a Darlington-connected pair of transistors and the level-translating circuit includes a second transistor having first and second terminals connected in series with a second resistive element, between the control terminal of the switch and the circuit node, the second transistor having a control terminal connected to a reference voltage.

9. A circuit according to claim 8 wherein second transistor is a depletion type metal oxide semiconductor (MOS) device.

10. A circuit for connecting a subscriber apparatus to a telephone line having two line terminals, comprising:

an electronic switch having an input terminal, an output terminal, and a control terminal, the switch being connected to receive a line signal from the telephone line at the input terminal and to provide the line signal at the output terminal in response to a control signal at the control terminal;

a galvanic isolation element having a subscriber input terminal for coupling to a subscriber apparatus and an output terminal coupled to provide a coupled signal in response to an input signal containing an information component at the subscriber input terminal; and a level shifter coupled to the output terminal of the galvanic isolation element including first and second current legs coupled to the output terminal of the galvanic isolation element, the first current leg being coupled between the control terminal of the electronic switch and the output terminal of the isolation element the first current leg being configured to provide the control signal to the electronic switch in response to the coupled signal and the second current leg being configured to provide an information signal corresponding to the information component in response to the coupled.

11. The circuit of claim 10 wherein the galvanic isolation element is a photocoupler.

12. The circuit of claim 10 wherein the first current leg a control transistor connected.

13. The circuit of claim 12 further including biasing circuit that includes a plurality of serially connected diodes providing a biasing voltage at a biasing node coupled to a control terminal of the control transistor.

* * * * *

UNITED STATES PATENT AND TRADEMARK OFFICE
CERTIFICATE OF CORRECTION

PATENT NO. : 5,692,041
DATED : November 25, 1997
INVENTOR(S) : Aldo Torazzina

It is certified that error appears in the above-identified patent and that said Letters Patent is hereby corrected as shown below:

In column 6, claim 9, line 30, after "wherein" insert -- the --.

In column 6, claim 12, line 60, after "leg" insert -- includes --.

In column 6, claim 12, line 61, after "transistor" delete -- connected --.

In column 6, claim 13, line 62, after "including" insert -- a --.

Signed and Sealed this

Twenty-ninth Day of September, 1998

Attest:

BRUCE LEHMAN

*Attesting Officer*          *Commissioner of Patents and Trademarks*